US011003011B2

(12) United States Patent
Lee et al.

(10) Patent No.: US 11,003,011 B2
(45) Date of Patent: May 11, 2021

(54) DISPLAY PANEL, DISPLAY DEVICE, AND METHOD OF FABRICATING DISPLAY PANEL

(71) Applicant: Samsung Display Co., Ltd., Yongin-Si (KR)

(72) Inventors: Hongbeom Lee, Hwaseong-si (KR); Kyungtae Chae, Hwaseong-si (KR); Hanjun Yu, Seoul (KR); Yeogeon Yoon, Suwon-si (KR); Keunwoo Park, Incheon (KR)

(73) Assignee: Samsung Display Co., Ltd.

( * ) Notice: Subject to any disclaimer, the term of this patent is extended or adjusted under 35 U.S.C. 154(b) by 50 days.

(21) Appl. No.: 16/174,142

(22) Filed: Oct. 29, 2018

(65) Prior Publication Data

US 2019/0196259 A1  Jun. 27, 2019

(30) Foreign Application Priority Data

Dec. 26, 2017 (KR) .......................... 10-2017-0179992

(51) Int. Cl.
  *G02F 1/1335* (2006.01)
  *G02F 1/13357* (2006.01)
  *G02F 1/1333* (2006.01)

(52) U.S. Cl.
  CPC .. *G02F 1/133512* (2013.01); *G02F 1/133514* (2013.01); *G02F 1/133528* (2013.01);
  (Continued)

(58) Field of Classification Search
  CPC ......... G02F 1/133512; G02F 1/133514; G02F 2001/136222; G02F 2201/52;
  (Continued)

(56) References Cited

U.S. PATENT DOCUMENTS

2013/0242228 A1 9/2013 Park et al.
2014/0313691 A1* 10/2014 Kaida ............... G02F 1/133504
362/19

(Continued)

FOREIGN PATENT DOCUMENTS

KR  10-2013-0104862 A  9/2013
KR  10-2017-0014755 A  2/2017
KR  10-2017-0051839 A  5/2017

OTHER PUBLICATIONS

Madigan, C. F.; Lu, M.-H.; Sturm, J. C. "Improvement of output coupling efficiency of organic light-emitting diodes by backside substrate modification", Applied Physics Letters, 2000, 76.13: 1650-1652., 3 pages.

(Continued)

*Primary Examiner* — Jia X Pan
(74) *Attorney, Agent, or Firm* — Innovation Counsel LLP

(57) ABSTRACT

A display panel may include a first base substrate, a second base substrate facing the first base substrate, a plurality of wavelength conversion parts that are provided on the first base substrate to face the second base substrate, and at least one of the plurality of wavelength conversion parts includes an emission body, a light blocking layer partially covering the plurality of wavelength conversion parts and having a plurality of openings, the light blocking layer including a metallic material, and a first organic layer provided on the light blocking layer without overlapping the openings.

12 Claims, 13 Drawing Sheets

(52) U.S. Cl.
CPC ............... *G02F 1/133602* (2013.01); *G02F 2001/133357* (2013.01)

(58) Field of Classification Search
CPC .. G02F 1/133528; G02F 2001/133357; G09G 3/2003; G09G 2300/0452; G09G 2300/0443; G09G 3/3607; G09G 3/3611; G09G 5/02; G02B 5/201; G02B 5/3025; H01L 27/322; H01L 27/3213; H01L 27/3218; H01L 27/3211
See application file for complete search history.

(56) References Cited

U.S. PATENT DOCUMENTS

| | | | |
|---|---|---|---|
| 2015/0124188 A1* | 5/2015 | Kadowaki | G02F 1/133514 349/42 |
| 2015/0131029 A1* | 5/2015 | Kaida | G02F 1/1336 349/69 |
| 2015/0176775 A1* | 6/2015 | Gu | G02F 1/133617 349/42 |
| 2015/0205159 A1* | 7/2015 | Itou | G02F 1/133617 349/110 |
| 2015/0362644 A1* | 12/2015 | Tian | G02B 5/201 359/891 |
| 2016/0357039 A1* | 12/2016 | Kim | G02F 1/133621 |
| 2017/0031205 A1* | 2/2017 | Lee | G02F 1/133621 |
| 2017/0059940 A1* | 3/2017 | Kim | G02F 1/133617 |
| 2017/0125740 A1* | 5/2017 | Lee | H01L 27/322 |
| 2017/0153368 A1* | 6/2017 | Yoon | G02F 1/133514 |
| 2017/0222005 A1 | 8/2017 | Lin et al. | |
| 2018/0045866 A1* | 2/2018 | Chae | G02F 1/133553 |
| 2018/0113356 A1* | 4/2018 | Lee | G02F 1/134309 |
| 2018/0231843 A1* | 8/2018 | Park | G02F 1/133509 |
| 2019/0243182 A1* | 8/2019 | Chien | G02F 1/133514 |

OTHER PUBLICATIONS

Nakamura, Toshitaka, et al. "Thin-film waveguiding mode light extraction in organic electroluminescent device using high refractive index substrate", Journal of applied physics, 2005, 975: 054505, 7 pages.

Melpignano, P., et al. "Efficient light extraction and beam shaping from flexible, optically integrated organic light-emitting diodes." Applied physics letters, 2006, 88.15:153514., 4 pages.

* cited by examiner

DISPLAY PANEL, DISPLAY DEVICE, AND METHOD OF FABRICATING DISPLAY PANEL

CROSS-REFERENCE TO RELATED APPLICATIONS

This U.S. non-provisional patent application claims priority under 35 U.S.C. § 119 to Korean Patent Application No. 10-2017-0179992, filed on Dec. 26, 2017, in the Korean Intellectual Property Office, the disclosure of which is hereby incorporated by reference in its entirety.

BACKGROUND OF THE INVENTION

The present disclosure relates to a display panel, a display device including the display panel, and a method of fabricating the display panel.

A liquid crystal display device includes a liquid crystal display panel, in which two opposite substrates and a liquid crystal layer disposed between the two substrates are provided. If a voltage is applied to an electrode of the liquid crystal display device, an electric field is exerted to the liquid crystal layer. Such an electric field is used to control an alignment direction of liquid crystal molecules of the liquid crystal layer and a polarization of an incident light. This process is used to display an image on the liquid crystal display device. The liquid crystal display device includes a color-conversion element that is configured to represent a desired color. The color-conversion element includes a pigment particle of a specific color or an emission body that is configured to emit a specific color of light. In a case where the color-conversion element includes the emission body, light is emitted from the emission body in all directions, thereby causing a color-mixing issue between adjacent pixels.

SUMMARY

Some embodiments of the inventive concept provide a display panel with an enhanced display quality and improved optical efficiency, a display device including the display panel, and a method of fabricating the display panel with an easily-controllable flatness property.

According to some embodiments of the inventive concept, a display panel may include a first base substrate, a second base substrate facing the first base substrate, a plurality of wavelength conversion parts that are provided on the first base substrate to face the second base substrate, and at least one of the plurality of wavelength conversion parts includes an emission body, a light blocking layer covering the plurality of wavelength conversion parts and having a plurality of openings, the light blocking layer including a metallic material, and a first organic layer provided on the light blocking layer without overlapping the openings.

In some embodiments, the display panel may further include a second organic layer covering the first organic layer and overlapping the openings, when viewed in a plan view.

In some embodiments, the display panel may further include a second organic layer covering the plurality of openings.

In some embodiments, the emission body may be a quantum dot.

In some embodiments, the display panel may further include a cover layer that is provided between the plurality of wavelength conversion parts and the light blocking layer to cover the plurality of wavelength conversion parts. Each of the plurality of openings may expose a portion of the cover layer.

In some embodiments, the cover layer may include an inorganic layer or to include an inorganic layer and an organic layer.

In some embodiments, the display panel may further include a supplementary light blocking layer that is provided on a surface of the first base substrate to overlap the light blocking layer. The light blocking layer may be provided between the supplementary light blocking layer and the first organic layer, when viewed in a sectional view.

In some embodiments, the supplementary light blocking layer may include an organic light-blocking material.

In some embodiments, the plurality of wavelength conversion parts may include a first wavelength conversion part including a first emission body configured to absorb a first color light and to emit a second color light, whose color is different from that of the first color light, a second wavelength conversion part including a second emission body configured to absorb the first color light and to emit a third color light, whose color is different from those of the first and second color lights, and a third wavelength conversion part configured to allow the first color light to pass therethrough.

In some embodiments, the display panel may further include a supplementary conversion part provided between the plurality of wavelength conversion parts and the first base substrate. The supplementary conversion part may be spaced apart from with the third wavelength conversion part, when viewed in a plan view.

In some embodiments, the supplementary conversion part may include a first color filter layer, and the first color filter layer may be a yellow color filter layer.

In some embodiments, the supplementary conversion part may include a second color filter layer that is configured to emit light whose color is same as that of the second color light, and a third color filter layer that is configured to emit light whose color is same as that of the third color light. The second color filter layer may be provided between the first wavelength conversion part and the first base substrate, and the third color filter layer may be provided between the second wavelength conversion part and the first base substrate.

In some embodiments, the display panel may further include a polarizing layer provided on the first organic layer.

According to some embodiments of the inventive concept, a display device may include a display panel configured to display an image, and a backlight unit provided adjacent to the display panel to provide light to the display panel. The display panel may include a first base substrate, a second base substrate provided between the first base substrate and the backlight unit, a liquid crystal layer provided between the first base substrate and the second base substrate, a plurality of wavelength conversion parts provided between the first base substrate and the liquid crystal layer, and configured to change a wavelength of light incident thereto or to allow the incident light to pass therethrough, a metal light blocking layer partially covering the plurality of wavelength conversion parts and having a plurality of openings, each of the plurality of openings is provided at a position corresponding to a center region of a corresponding one of the wavelength conversion parts, and a first organic layer provided on the metal light blocking layer without overlapping the plurality of openings, when viewed in a plan view.

In some embodiments, the display device may further include a second organic layer covering the plurality of openings.

In some embodiments, the second organic layer may be extended to cover the first organic layer.

According to some embodiments of the inventive concept, a method of fabricating a display panel may include preparing a first base substrate, forming a plurality of wavelength conversion parts on a surface of the first base substrate, forming a metal layer to cover the plurality of wavelength conversion parts, forming a first organic preliminary layer on the metal layer, patterning the first organic preliminary layer to form a first organic layer that exposes a portion of the metal layer, and etching the portion of the metal layer exposed by the first organic layer to form a light blocking layer.

In some embodiments, the method may further include polishing the first organic layer, after forming the first organic layer and before etching the portion of the metal layer.

In some embodiments, the method may further include forming a second organic layer to cover the first organic layer, after forming the light blocking layer.

In some embodiments, the method may further include polishing the second organic layer.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
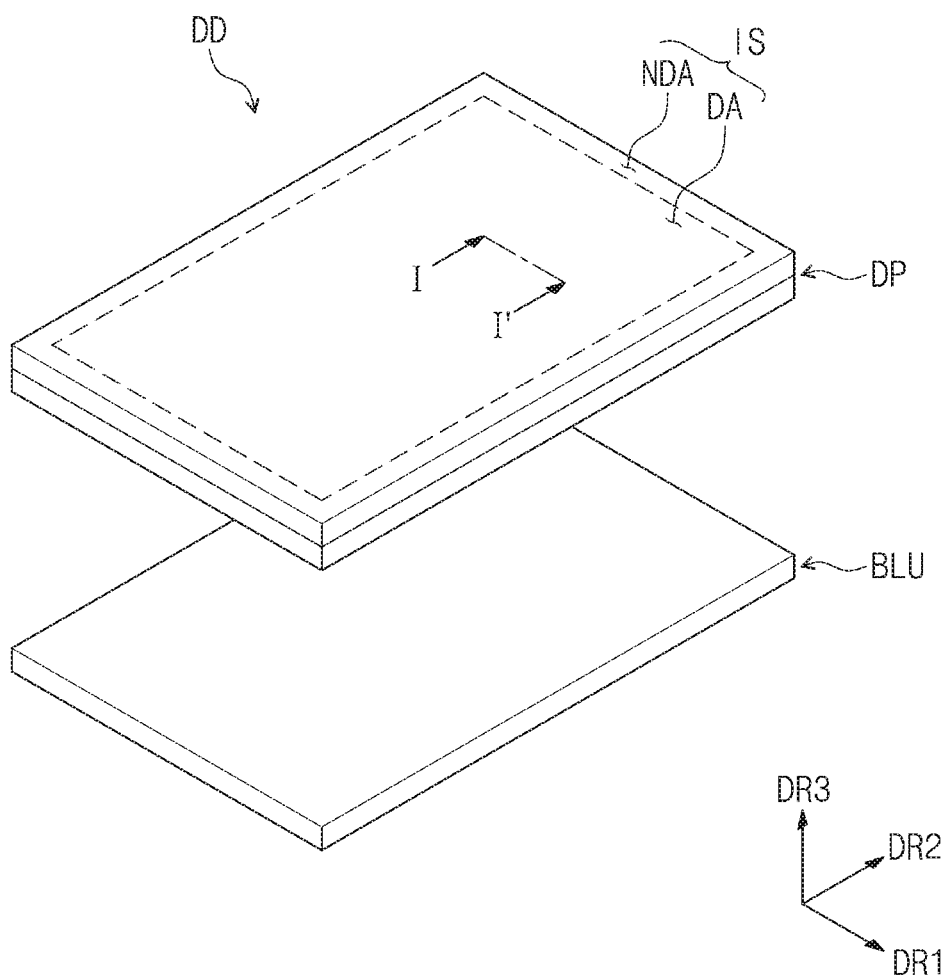
FIG. 1 is an exploded perspective view illustrating a display device according to some embodiments of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concept will now be described more fully with reference to the accompanying drawings, in which example embodiments are shown. Example embodiments of the inventive concept may, however, be embodied in many different forms and should not be construed as being limited to the embodiments set forth herein; rather, these embodiments are provided so that the present disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their repeated description will be omitted.

It will be understood that when an element is referred to as being "connected" or "coupled" to another element, it can be directly connected or coupled to the other element or one or more intervening elements may be present. In contrast, when an element is referred to as being "directly connected" or "directly coupled" to another element, there may be no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations), and the spatially relative descriptors used herein are interpreted accordingly.

The terminology used herein is for the purpose of describing particular embodiments and is not intended to be limiting of example embodiments. As used herein, the singular forms "a," "an," and "the" are intended to include the plural forms as well, unless the context clearly indicates otherwise. It will be further understood that the terms "comprises", "comprising", "includes," and/or "including," if used herein, specify the presence of stated features, integers, steps, operations, elements, and/or components, but do not preclude the presence or addition of one or more other features, integers, steps, operations, elements, components, and/or groups thereof.

FIG. 1 is an exploded perspective view illustrating a display device according to some embodiments of the inventive concept.

Referring to FIG. 1, a display device DD may include a display panel DP and a backlight unit BLU.

Various display panels, such as a liquid crystal display panel, a plasma display panel, an electrophoretic display panel, and an electrowetting display panel may be used as the display panel DP, and the inventive concept is not limited to a specific type of the display panel DP. For the sake of simplicity, the following description will refer to an example of the present embodiment in which a liquid crystal display panel is used as the display panel DP.

The display panel DP may be configured to display an image through a display surface IS. In FIG. 1, the display surface IS is illustrated to have a flat surface defined by two different directions (e.g., a first direction DR1 and a second direction DR2). However, this is just an example of the display surface IS, and in certain embodiments, although not shown, a display surface of a display panel may have a curved shape.

A direction normal to the display surface IS (i.e., a thickness direction of the display panel DP) will be referred to as a third direction DR3. A front or top surface and a rear or bottom surface of each member may be distinguished, based on the third direction DR3. However, directions indicated by the first to third directions DR1, DR2, and DR3 are shown as an example, and in certain embodiments, they may be changed to indicate other directions. Hereinafter, first to third directions may be directions indicated by the first to third directions DR1, DR2, and DR3, respectively, and will be referenced with the same numerals.

The display surface IS may include a display region DA that is used to display an image and a non-display region NDA adjacent to the display region DA. The non-display region NDA may not be used to display an image. As an example, the display region DA may be provided to have a tetragonal or rectangular shape, and the non-display region NDA may be provided to enclose the display region DA. However, the inventive concept is not limited thereto, and the shapes of the display region DA and the non-display region NDA may be variously changed in a mutually influential manner. In certain embodiments, the display device DD may be configured to have the display surface IS without including the non-display region NDA.

The backlight unit BLU may be provided below the display panel DP and may be used to provide light to the display panel DP. The backlight unit BLU may include a light source (not shown) that is configured to provide a blue light or a white light to the display panel DP. However, the inventive concept is not limited to this example, and in certain embodiments, the color of light provided from the light source of the backlight unit BLU may be variously changed.

Figure 2:
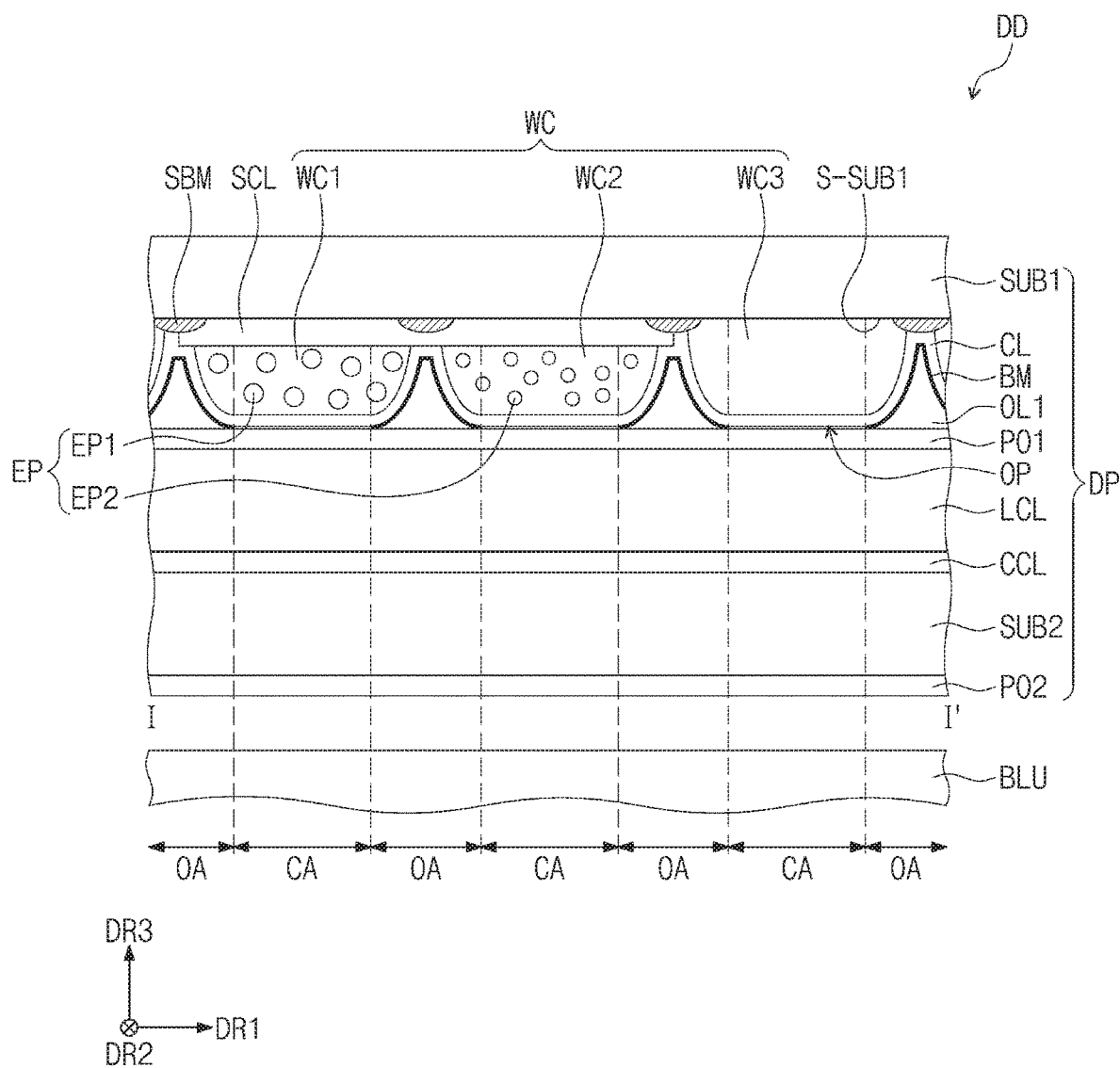
FIG. 2 is a sectional view taken along line I-I' of FIG. 1, according to a first embodiment.
Figure 3:
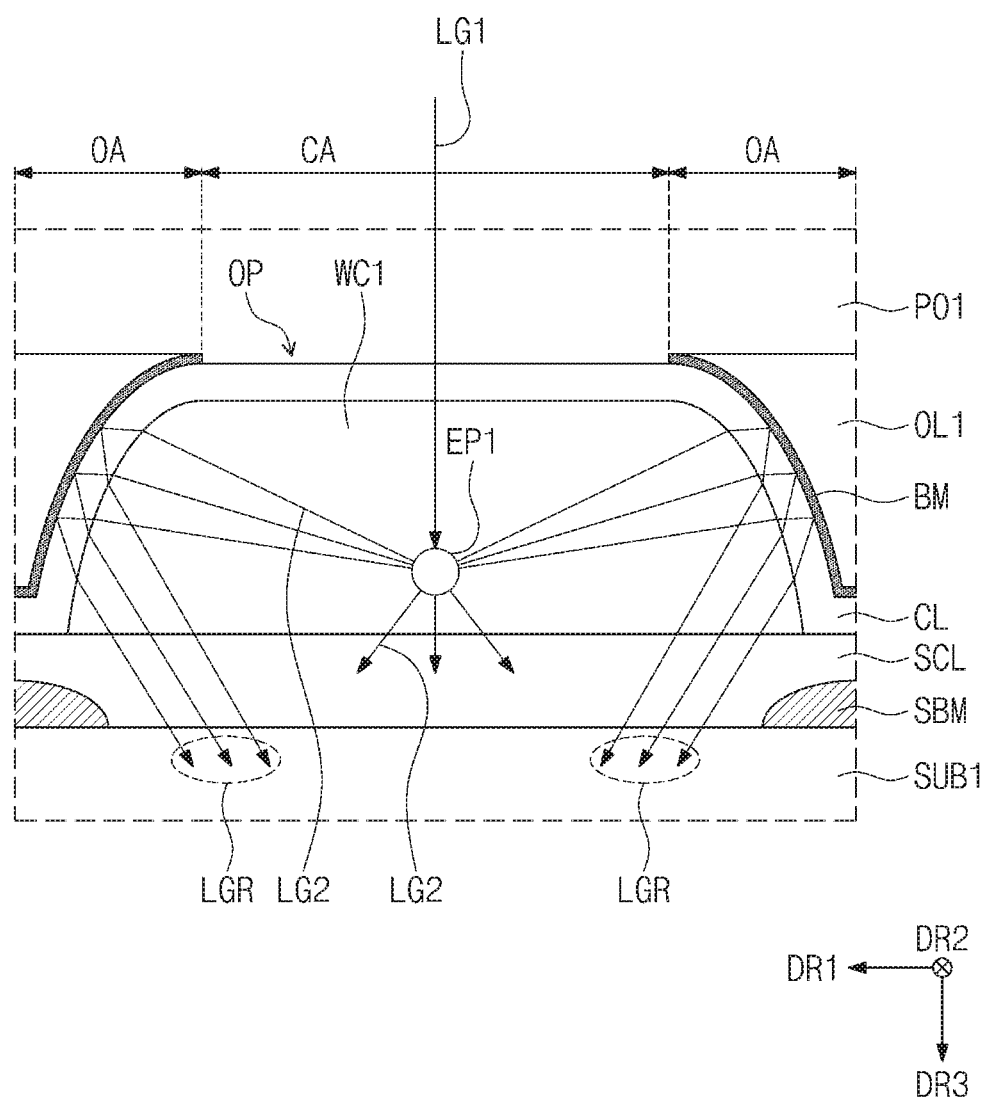
FIG. 3 is an enlarged sectional view illustrating a portion of a wavelength conversion part.

FIG. 2 is a sectional view taken along line I-I' of FIG. 1, according to a first embodiment, and FIG. 3 is an enlarged sectional view illustrating a portion of a wavelength conversion part.

Referring to FIG. 2, the display panel DP may include a first base substrate SUB1, a second base substrate SUB2, a wavelength conversion part WC, a supplementary light blocking layer SBM, a light blocking layer BM, a first organic layer OL1, a liquid crystal layer LCL, a circuit layer CCL, a first polarizing layer PO1, and a second polarizing layer PO2.

The first and second base substrates SUB1 and SUB2 may be spaced apart from each other in the third direction DR3, and the second base substrate SUB2 may be provided between the first base substrate SUB1 and the backlight unit BLU.

Each of the first and second base substrates SUB1 and SUB2 may be a transparent substrate. For example, each of the first and second base substrates SUB1 and SUB2 may be provided in the form of a silicon substrate, a plastic substrate, a glass substrate, an insulating film, or a stack including a plurality of insulating layers. Each of the first and second base substrates SUB1 and SUB2 may be rigid or flexible.

The wavelength conversion part WC may be provided on a surface S-SUB1 of the first base substrate SUB1. The wavelength conversion part WC may include a first wavelength conversion part WC1, a second wavelength conversion part WC2, and a third wavelength conversion part WC3. At least one or more of the first wavelength conversion part WC1, the second wavelength conversion part WC2, and the third wavelength conversion part WC3 includes an emission body EP.

In one embodiment, the first wavelength conversion part WC1 may include a first emission body EP1, and the second wavelength conversion part WC2 may include a second emission body EP2. The first emission body EP1 may be configured to absorb a first color light that is provided from the backlight unit BLU, and to emit a second color light, whose color is different from that of the first color light, and the second emission body EP2 may be configured to absorb the first color light that is provided from the backlight unit BLU and to emit a third color light, whose color is different from those of the first and second color lights. The third wavelength conversion part WC3 may be configured to allow the first color light to pass therethrough. For example, there may be no emission body in the third wavelength conversion part WC3. The first color light may be a blue light, the second color light may be a red light, and the third color light may be a green light.

The emission body EP may be a quantum dot. The quantum dot may be selected from a group consisting of II-VI compounds, III-V compounds, IV-VI compounds, IV elements, IV compounds, and any combination thereof.

The II-VI compounds may be selected from a group consisting of binary compounds (e.g., including CdS, CdSe, CdTe, ZnS, ZnSe, ZnTe, ZnO, HgS, HgSe, HgTe, MgSe, MgS, and any combination thereof), ternary compounds (e.g., including CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and any combination thereof), and quaternary compounds (e.g., including HgZnTeS, CdZnSeS, CdZnSeTe, CdZnSTe, CdHgSeS, CdHgSeTe, CdHgSTe, HgZnSeS, HgZnSeTe, HgZnSTe, and any combination thereof).

The III-V compounds may be selected from a group consisting of binary compounds (e.g., including GaN, GaP, GaAs, GaSb, AlN, AlP, AlAs, AlSb, InN, InP, InAs, InSb, and any combination thereof), ternary compounds (e.g., including GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and any combination thereof), and quaternary compounds (e.g., including GaAlNAs, GaAlNSb, GaAlPAs, GaAlPSb, GaInNP, GaInNAs, GaInNSb, GaIn- PAs, GaInPSb, InAlNP, InAlNAs, InAlNSb, InAlPAs, InAlPSb, and any combination thereof).

The IV-VI compounds may be selected from a group consisting of binary compounds (e.g., including SnS, SnSe, SnTe, PbS, PbSe, PbTe and any combination thereof), ternary compounds (e.g., including SnSeS, SnSeTe, SnSTe, PbSeS, PbSeTe, PbSTe, SnPbS, SnPbSe, SnPbTe, and any combination thereof), and quaternary compounds (e.g., including SnPbSSe, SnPbSeTe, SnPbSTe, and any combination thereof).

The IV elements may be selected from a group consisting of Si, Ge, and combination thereof. The IV compounds may include binary compounds selected from a group consisting of binary compounds (e.g., including SiC, SiGe, and combination thereof).

Here, in each particle, the binary, ternary, or quaternary compound may be provided to have a uniform concentration throughout the particle or to have a varying (e.g., spatially divided) concentration distribution.

The quantum dot may have a core-shell structure including a core and a shell enclosing the core. In certain embodiments, a plurality of quantum dots may be provided to have a core/shell structure including one core quantum dot and other quantum dots enclosing the core quantum dot. At an interface between the core and the shell, an element contained in the shell may be provided to have a concentration gradient decreasing (or increasing) toward a central direction.

The quantum dot may be a nanometer-scale particle. The quantum dot may be provided to have a light-emitting wavelength spectrum whose full width half maximum (FWHM) is less than about 45 nm (in particular, less than about 40 nm or in more particular, less than about 30 nm), and in this case, it may be possible to improve color purity or color reproduction characteristics. Furthermore, light from the quantum dot may be emitted radially or in all directions, and this may improve a viewing angle property of the display device DD.

In some embodiments, the quantum dot may be a spherical, pyramid-shaped, multi-armed, or include a cubic nano particle or may be provided in the form of a nanotube, a nano wire, a nano fiber, a nano plate-shaped particle. However, the inventive concept is not limited thereto.

Color of light emitted from the quantum dot may be changed depending on a particle size. For example, a particle size of the quantum dot included in the first emission body EP1 may be different from that of the quantum dot included in the second emission body EP2. As an example, the particle size of the quantum dot included in the first emission body EP1 may be larger than that of the quantum dot included in the second emission body EP2. In this case, the first emission body EP1 may be used to emit light whose wavelength is longer than that of light to be emitted from the second emission body EP2.

A supplementary conversion part SCL may be further provided between the wavelength conversion part WC and the first base substrate SUB1. The supplementary conversion part SCL may be a yellow color filter layer. In this case, the supplementary conversion part SCL may absorb the first color light (e.g., blue light).

The supplementary conversion part SCL may be provided between the first wavelength conversion part WC1 and the first base substrate SUB1 and between the second wavelength conversion part WC2 and the first base substrate SUB1. When viewed in a plan view as shown in FIG. 2, the supplementary conversion part SCL may not overlap the third wavelength conversion part WC3. In other embodiments of the present disclosure, the plan view may be selected to be parallel to the top surface of the display panel DP or perpendicular to a thickness direction of the display panel DP or to the third direction DR3.

A cover layer CL may be provided below the wavelength conversion part WC. The cover layer CL may be disposed between the wavelength conversion part WC and the second base substrate SUB2. The cover layer CL may be provided to have a single-layered including an inorganic layer or a stacking structure including an inorganic layer and an organic layer. The inorganic layer may be formed of or include silicon nitride or silicon oxide.

The cover layer CL may be used to protect the wavelength conversion part WC. Furthermore, the cover layer CL may have a refractive property to change a propagation path of light propagating from the emission body EP toward the light blocking layer BM and a propagation path of the light reflected from the light blocking layer BM toward the center of the pixel corresponding to the first wavelength conversion part WC1.

The light blocking layer BM may be provided below the cover layer CL. The light blocking layer BM may be formed of or include at least one of metallic materials or metal oxide materials. The metallic materials may include aluminum (Al), silver (Ag), copper (Cu), and titanium (Ti). The light blocking layer BM may be referred to as "a metal light blocking layer BM". The light blocking layer BM may include one or more metal layers. In a case where the light blocking layer BM includes a plurality of metal layers, the metal layers may be formed of or include at least two different materials.

The light blocking layer BM may be provided to have a plurality of openings OP. Each of the openings OP may be formed to expose a portion of the cover layer CL. In a case where the cover layer CL is not provided, each of the openings OP may be formed to expose a portion of the wavelength conversion part WC. When viewed in a plan view, the light blocking layer BM may overlap an outer region OA of the wavelength conversion part WC, but not with a center region CA of the wavelength conversion part WC. When viewed in a sectional view, the light blocking layer BM may be provided to cover an inclined surface of the wavelength conversion part WC.

Referring to FIG. 3, a first color light LG1 provided from the backlight unit BLU may pass through the opening OP of the light blocking layer BM. The first emission body EP1 may be configured to absorb the first color light LG1 and emit a second color light LG2. Although not shown in FIG. 3, the second emission body EP2 of FIG. 2 may be configured to absorb the first color light LG1 and emit a third color light that is different from the second color light LG2.

The second color light LG2 emitted from a quantum dot (e.g., the first emission body EP1) may be emitted in all directions. In some embodiments, the outer region OA of the wavelength conversion part WC may be veiled by the light blocking layer BM. Thus, light that is emitted from the first emission body EP1 to propagate toward a neighboring wavelength conversion part (e.g., the second or third wavelength conversion part WC2 or WC3) may be reflected by the light blocking layer BM and may be re-incident into the first wavelength conversion part WC1. Accordingly, a color-mixing issue between adjacent pixels may be prevented by the light blocking layer BM.

In addition, a reflection light LGR reflected by the light blocking layer BM may propagate toward a center of the first wavelength conversion part WC1 due to the inclined shape of the light blocking layer BM. Such a centrally-concentrated propagation of the reflected light LGR may increase brightness of each pixel and increase a contrast ratio of the display device DD.

The supplementary light blocking layer SBM may be provided between the first base substrate SUB1 and the light blocking layer BM. The supplementary light blocking layer SBM may be configured to suppress or prevent an external light from being reflected by the light blocking layer BM. The supplementary light blocking layer SBM may include an organic light-blocking material that contains a black pigment or dye. However, the inventive concept is not limited to this example, and in certain embodiments, the supplementary light blocking layer SBM may be omitted.

Referring back to FIG. 2, the first organic layer OL1 may be provided below the light blocking layer BM. The first organic layer OL1 may not overlap the openings OP, when viewed in a plan view. In other words, the first organic layer OL1 may not overlap the center region CA of the wavelength conversion part WC and may overlap the outer region OA.

The first polarizing layer PO1 may be provided below the first organic layer OL1. For example, the first polarizing layer PO1 may be provided below the first organic layer OL1 and the cover layer CL. The first polarizing layer PO1 may be an in-cell type polarizing layer that is placed adjacent to the liquid crystal layer LCL. The first polarizing layer PO1 may be formed by a nano-imprint lithography method.

The first polarizing layer PO1 may be a reflection type polarizer that is configured to allow light with a specific polarization state to pass therethrough and to reflect light with a different polarization state. In certain embodiments, the first polarizing layer PO1 may be an absorption type polarizer that is configured to allow light with a specific polarization state to pass therethrough and to absorb light with a different polarization state.

The circuit layer CCL may be provided on a surface of the second base substrate SUB2 facing the first base substrate SUB1. The circuit layer CCL may include electrodes and thin-film transistors that form pixels and signal lines of the display panel DP.

The liquid crystal layer LCL may be provided between the first base substrate SUB1 and the second base substrate SUB2. The liquid crystal layer LCL may include a plurality of liquid crystal molecules. Liquid crystal molecules having dielectric anisotropy may be arranged or provided in the liquid crystal layer LCL.

The second polarizing layer PO2 may be provided on an opposite surface of the second base substrate SUB2. The second polarizing layer PO2 may be provided to face the first polarizing layer PO1 with the liquid crystal layer LCL interposed therebetween. The second polarizing layer PO2 may be an absorption type polarizer or a reflection type polarizer. The second polarizing layer PO2 may be formed by a coating or deposition process. In certain embodiments, the second polarizing layer PO2 may be a film type polarizer.

In FIG. 2, the second polarizing layer PO2 is illustrated to be placed between the second base substrate SUB2 and the backlight unit BLU, but the inventive concept is not limited thereto. For example, the second polarizing layer PO2 may be provided between the second base substrate SUB2 and the liquid crystal layer LCL. In this case, the second polarizing layer PO2 may be an in-cell type polarizer.

Figure 4:
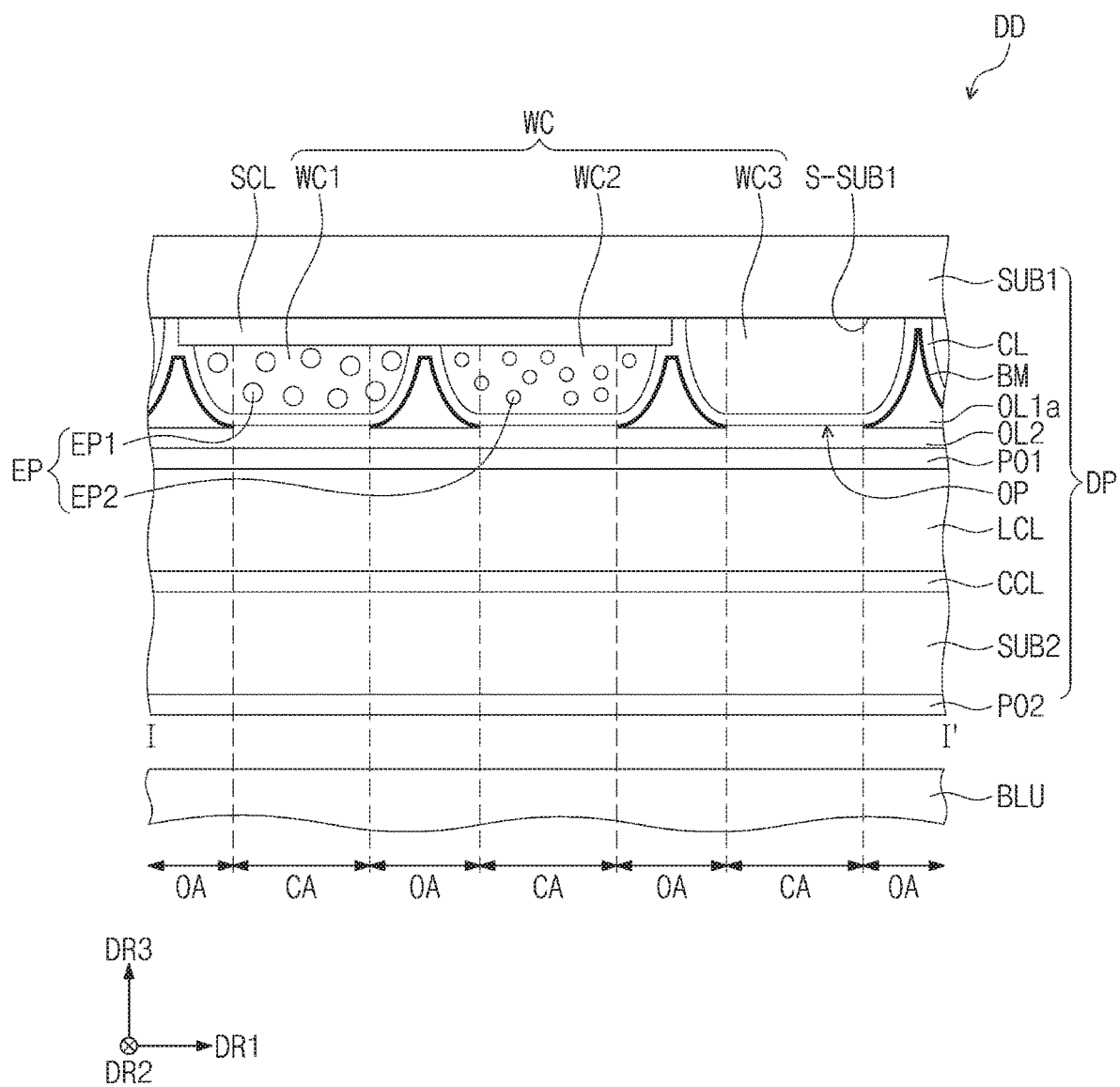
FIG. 4 is a sectional view taken along line I-I' of FIG. 1, according to a second embodiment.

FIG. 4 is a sectional view taken along line I-I' of FIG. 1, according to a second embodiment. In the following description of FIG. 4, an element previously described with reference to FIG. 2 will be identified by the same reference number without repeating an overlapping description thereof.

Referring to FIG. 4, the first organic layer OL1a may be provided below the light blocking layer BM. The first organic layer OL1a may not overlap the openings OP, when viewed in a plan view. In other words, the first organic layer OL1a may not overlap the center region CA of the wavelength conversion part WC and may overlap the outer region OA of the wavelength conversion part WC.

A second organic layer OL2 may be provided below the first organic layer OL1a to cover the first organic layer OL1a. The second organic layer OL2 may be provided to cover not only the first organic layer OL1a but also the opening OP. Thus, the lowermost bottom surface of the first organic layer OL1a and the lowermost bottom surface of the cover layer CL may be covered with the second organic layer OL2, and this may reduce or eliminate a difference in height between the lowermost bottom surface of the first organic layer OL1a and the lowermost bottom surface of the cover layer CL.

The first polarizing layer PO1 may be provided below the second organic layer OL2. The second organic layer OL2 may be formed to provide a flat surface, and the first polarizing layer PO1 may be formed on the flat surface of the second organic layer OL2. In some embodiments, the first polarizing layer PO1 may be formed by a nano-imprint lithography method. Since the first polarizing layer PO1 is formed on a highly flat surface, it may be possible to improve reliability of the first polarizing layer PO1.

Figure 5:
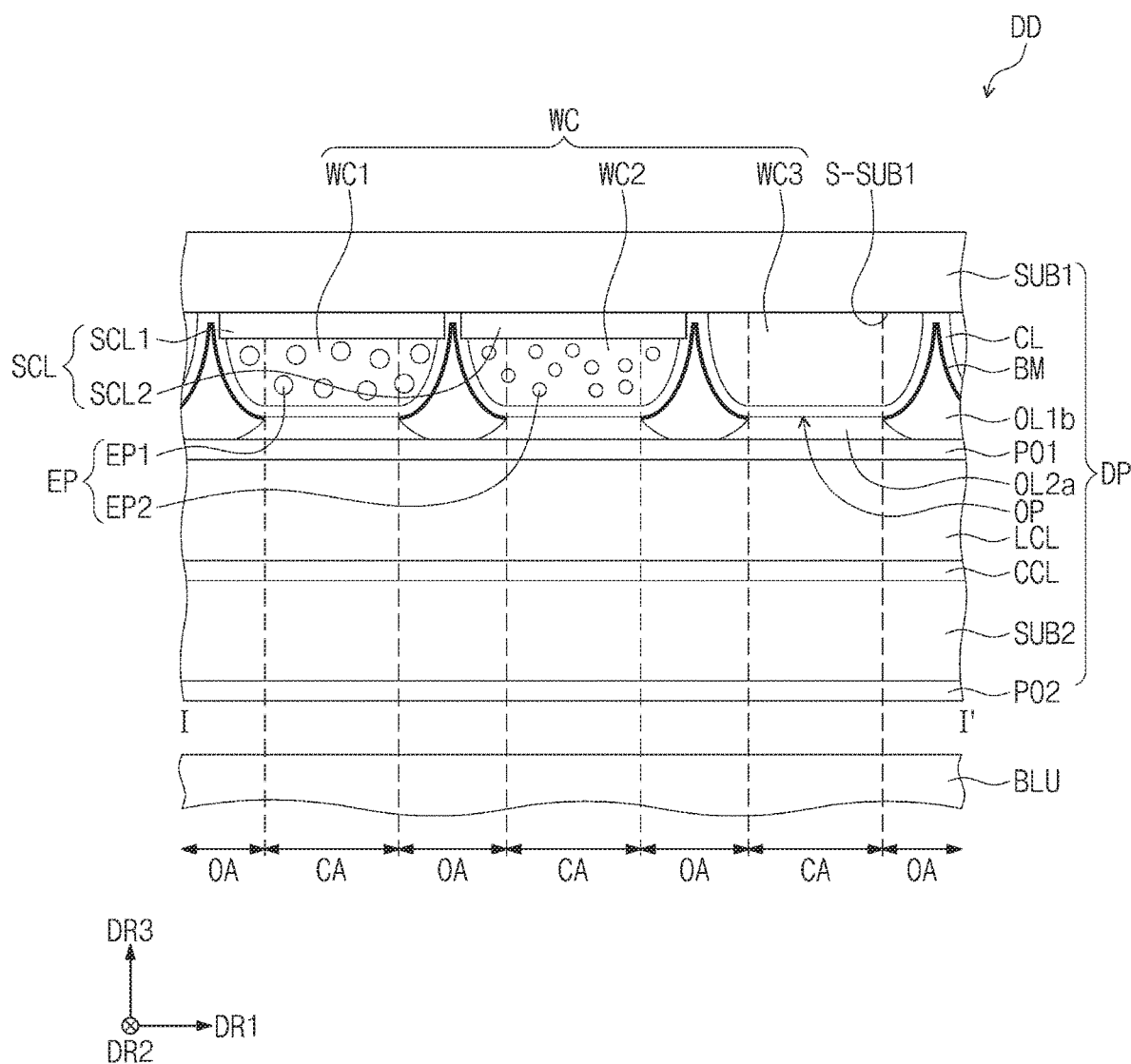
FIG. 5 is a sectional view taken along line I-I' of FIG. 1, according to a third embodiment.

FIG. 5 is a sectional view taken along line I-I' of FIG. 1, according to a third embodiment. In the following description of FIG. 5, an element previously described with reference to FIG. 2 will be identified by the same reference number without repeating an overlapping description thereof.

Referring to FIG. 5, the supplementary conversion part SCL may include a first supplementary conversion part SCL1 and a second supplementary conversion part SCL2 that are provided between the wavelength conversion part WC and the first base substrate SUB1.

The first supplementary conversion part SCL1 may be provided between the first wavelength conversion part WC1 and the first base substrate SUB1, and the second supplementary conversion part SCL2 may be provided between the second wavelength conversion part WC2 and the first base substrate SUB1. The first and second supplementary conversion parts SCL1 and SCL2 may be a yellow color filter layer that is configured to block the first color light (i.e., the blue light) or to absorb the first color light. However, the inventive concept is not limited to this example. For example, the first supplementary conversion part SCL1 may be a color filter layer configured to emit the second color light (e.g., red color light), and the second supplementary conversion part SCL2 may be another color filter layer configured to emit the third color light (e.g., green color light).

A first organic layer OL1b may be provided below the light blocking layer BM. The first organic layer OL1b may not overlap with the openings OP, when viewed in a plan view. In other words, the first organic layer OL1b may not overlap the center region CA of the wavelength conversion part WC and may overlap the outer region OA of the wavelength conversion part WC.

A second organic layer OL2a may be provided below the openings OP. The second organic layer OL2a may be provided to cover the openings OP.

The first polarizing layer PO1 may be provided below the first organic layer OL1b and the second organic layer OL2a. For example, the first and second organic layers OL1b and OL2a may be formed to provide a flat surface, and the first polarizing layer PO1 may be formed on the flat surface of the first and second organic layers OL1b and OL2a. The first polarizing layer PO1 may be formed by a nano-imprint lithography method.

Figure 6:
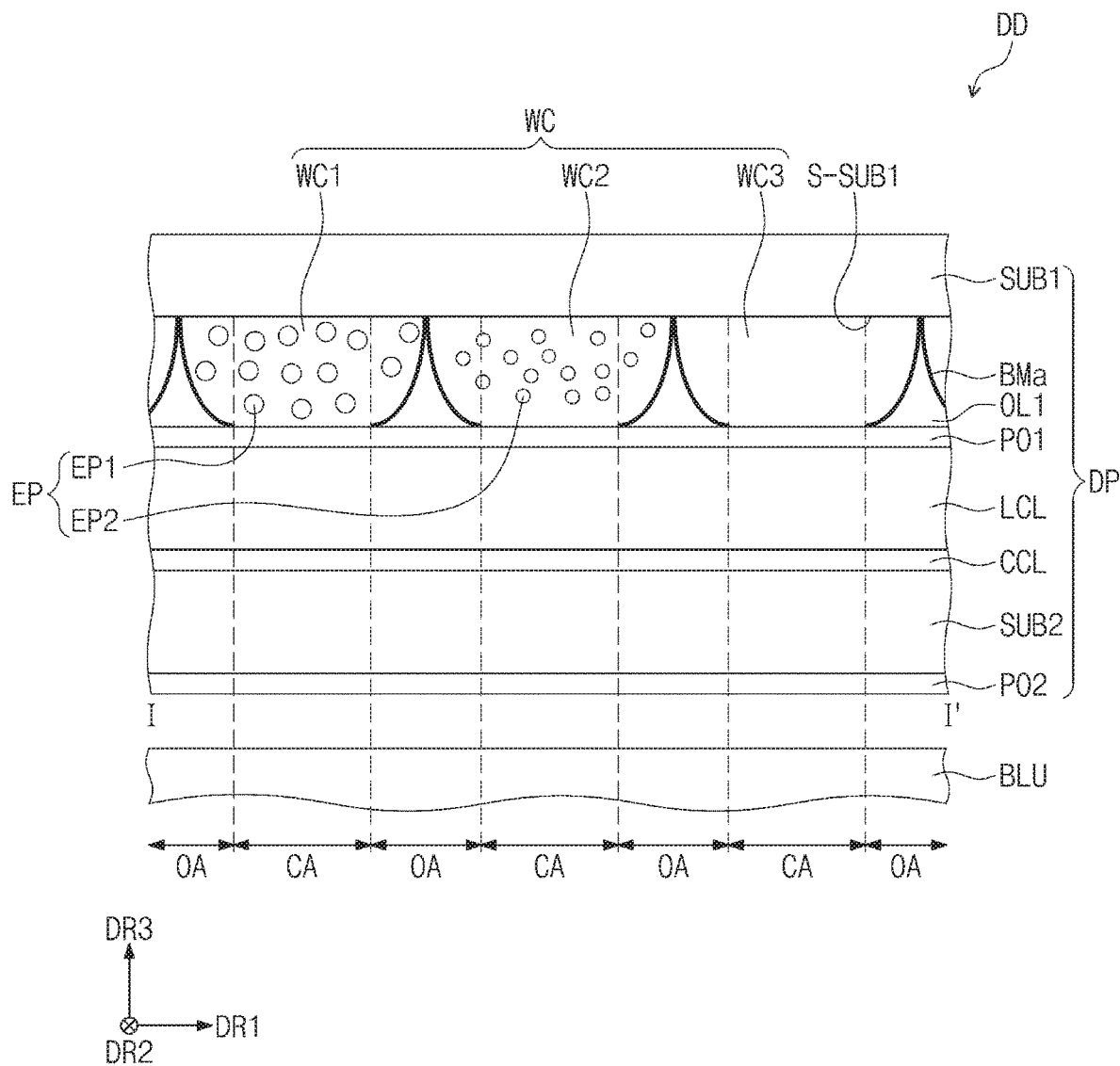
FIG. 6 is a sectional view taken along line I-I' of FIG. 1, according to a fourth embodiment.

FIG. 6 is a sectional view taken along line I-I' of FIG. 1, according to a fourth embodiment. In the following description of FIG. 6, an element previously described with reference to FIG. 2 will be identified by the same reference number without repeating an overlapping description thereof.

The supplementary conversion part SCL, the supplementary light blocking layer SBM, and the cover layer CL of FIG. 2 may be omitted from the display device DD shown in FIG. 6.

Referring to FIG. 6, when viewed in a section view, a light blocking layer BMa may be provided to cover an inclined surface of the wavelength conversion part WC. The light blocking layer BMa may be provided to have a plurality of openings OP. Each of the openings OP may be formed to expose a portion of the wavelength conversion part WC. In other words, when viewed in a plan view, the light blocking layer BMa may overlap the outer region OA of the wavelength conversion part WC but not with the center region CA of the wavelength conversion part WC.

The light blocking layer BMa may be formed of or include at least one of metallic materials or metal oxide materials. The metallic materials may include aluminum (Al), silver (Ag), copper (Cu), and titanium (Ti). The light blocking layer BMa may include one or more metal layers. In a case where the light blocking layer BMa includes a plurality of metal layers, the metal layers may be formed of or include at least two different materials.

In some embodiments, the outer region OA of the wavelength conversion part WC may be veiled by the light blocking layer BMa. Thus, if light emitted from an emission body EP (e.g., the first emission body EP1) included in a wavelength conversion part WC (e.g., the first wavelength conversion part WC1), propagates toward an adjacent wavelength conversion part WC (e.g., the second wavelength conversion part WC2), the light may be reflected by the light blocking layer BMa and may be re-incident into the wavelength conversion part WC including the emission body EP. Accordingly, a color-mixing issue between adjacent pixels may be prevented by the light blocking layer BMa.

FIGS. 7A to 7I are sectional views illustrating steps in a process of fabricating a display panel, according to some embodiments of the inventive concept. For example, FIGS. 7A to 7I illustrate steps in an example process of fabricating the display panel DP of FIG. 2. An element described with reference to FIG. 2 will be identified by the same reference number without repeating an overlapping description thereof.

Figure 7A:
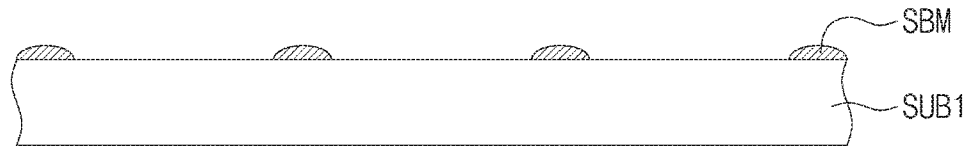
FIGS. 7A to 7I are sectional views illustrating steps in a process of fabricating a display panel, according to some embodiments of the inventive concept.
Figure 7A:
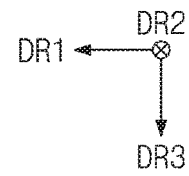

Referring to FIG. 7A, the first base substrate SUB1 may be prepared. Although not shown, the first base substrate SUB1 may be disposed on a working substrate (not shown), during a fabrication process. The working substrate may be removed, after the fabrication of the display panel DP.

The supplementary light blocking layer SBM may be formed on the first base substrate SUB1. The supplementary light blocking layer SBM may be formed by printing an organic light-blocking material that contains a black pigment or dye on the first base substrate SUB1. However, the inventive concept is not limited to this example, and in certain embodiments, the supplementary light blocking layer SBM may be omitted.

Figure 7B:
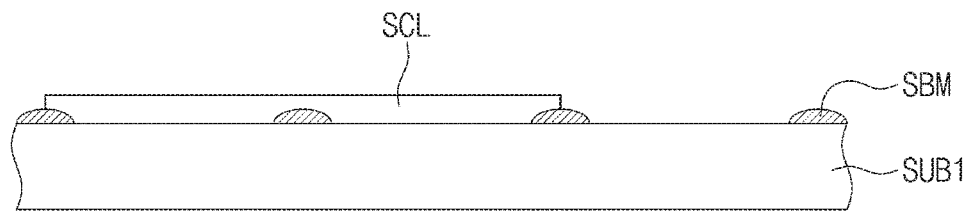
Figure 7B:
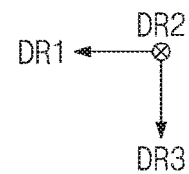

Referring to FIG. 7B, the supplementary conversion part SCL may be formed on the supplementary light blocking layer SBM and the first base substrate SUB1. The supplementary conversion part SCL may be continuously printed on both of first and second regions on which the first and second wavelength conversion parts WC1 and WC2 will be formed. The supplementary conversion part SCL may be a color filter layer that contains a yellow dye absorbing blue light. However, the inventive concept is not limited to this example, and in certain embodiments, the supplementary conversion part SCL may include at least two separate portions that are formed on the first and second regions, respectively, or may be omitted.

Figure 7C:
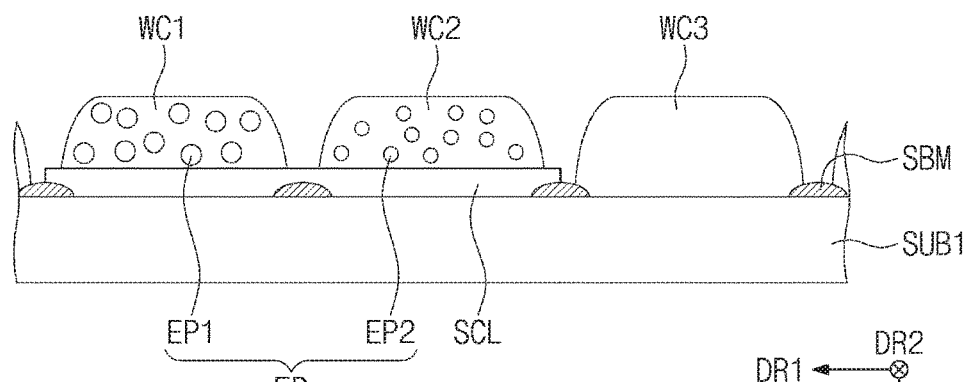
Figure 7C:
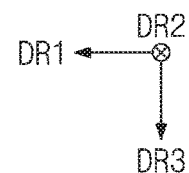

Referring to FIG. 7C, first to third wavelength conversion parts WC1, WC2, and WC3 may be formed. The first wavelength conversion part WC1 and the second wavelength conversion part WC2 may be formed on the supplementary conversion part SCL, and the third wavelength conversion part WC3 may be directly formed on the first base substrate SUB1.

Each of the first to third wavelength conversion parts WC1, WC2, and WC3 may include a base resin. The base resin may be at least one of polymer resins (e.g., acrylic resins, urethane resins, silicone resins, or epoxy resins). The first and second emission bodies EP1 and EP2 may be respectively provided in the base resin of the first and second wavelength conversion parts WC1 and WC2 in a distributed manner.

The first emission bodies EP1 included in the first wavelength conversion part WC1 may be a quantum dot that is configured to absorb a blue light and emit a red light, and the second emission bodies EP2 included in the second wavelength conversion part WC2 may be a quantum dot that is configured to absorb a blue light and emit a green light.

Figure 7D:
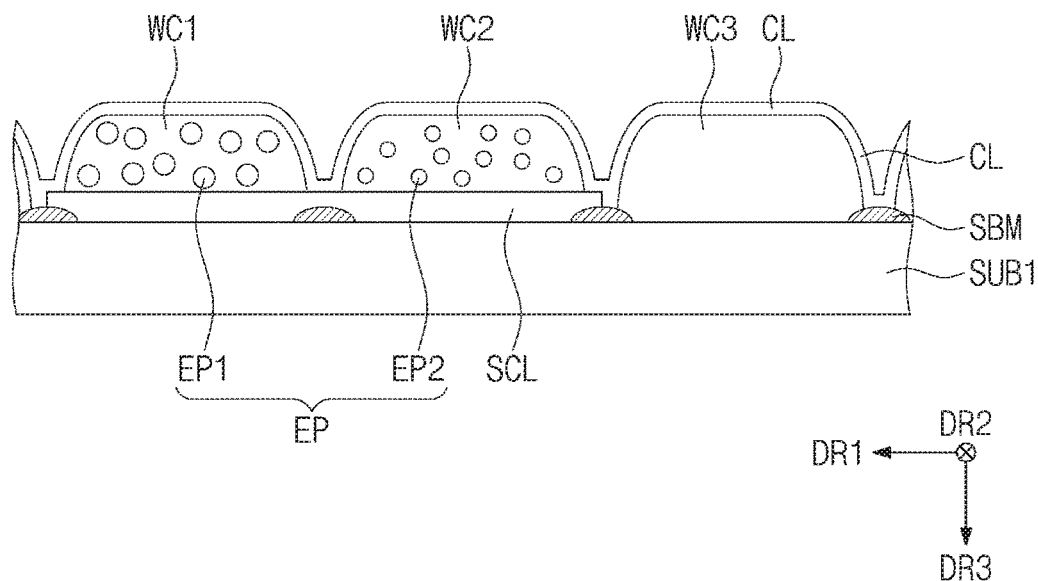

Referring to FIG. 7D, the cover layer CL may be formed to cover the first to third wavelength conversion parts WC1, WC2, and WC3. The cover layer CL may be an inorganic layer that is formed using a deposition process. However, the inventive concept is not limited to this example, and in certain embodiments, the cover layer CL may be formed to have a stacking structure including an inorganic layer and an organic layer that are sequentially deposited. In certain embodiments, the cover layer CL may be omitted.

Figure 7E:
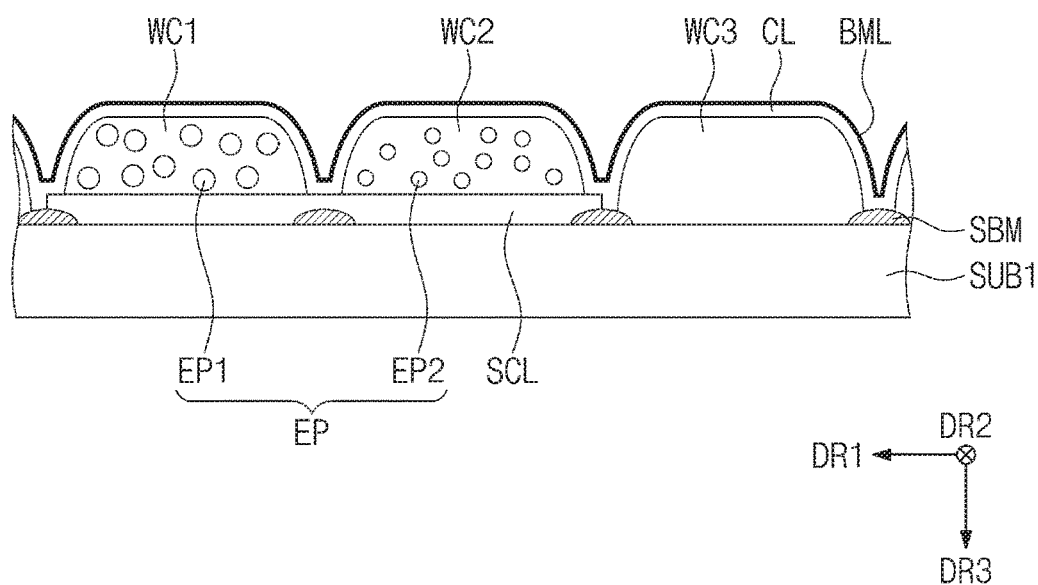

Referring to FIG. 7E, a metal layer BML may be formed on the cover layer CL. The metal layer BML may be formed of or include a highly reflective material. The metal layer BML may be provided in the form of a single metal layer or a plurality of stacked metal layers.

Figure 7F:
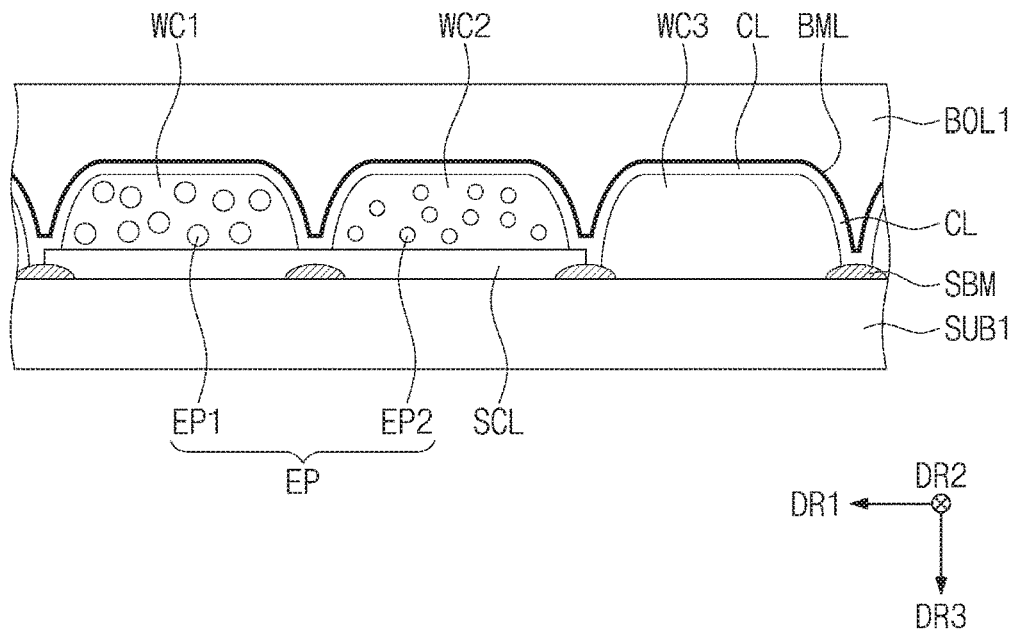

Referring to FIG. 7F, a first organic preliminary layer BOL1 may be formed on the metal layer BML. When viewed in a plan view, the first organic preliminary layer BOL1 may overlap all of the center and outer regions CA and OA of each of the first to third wavelength conversion parts WC1, WC2, and WC3 to cover the entire top surface of the metal layer BML.

Figure 7G:
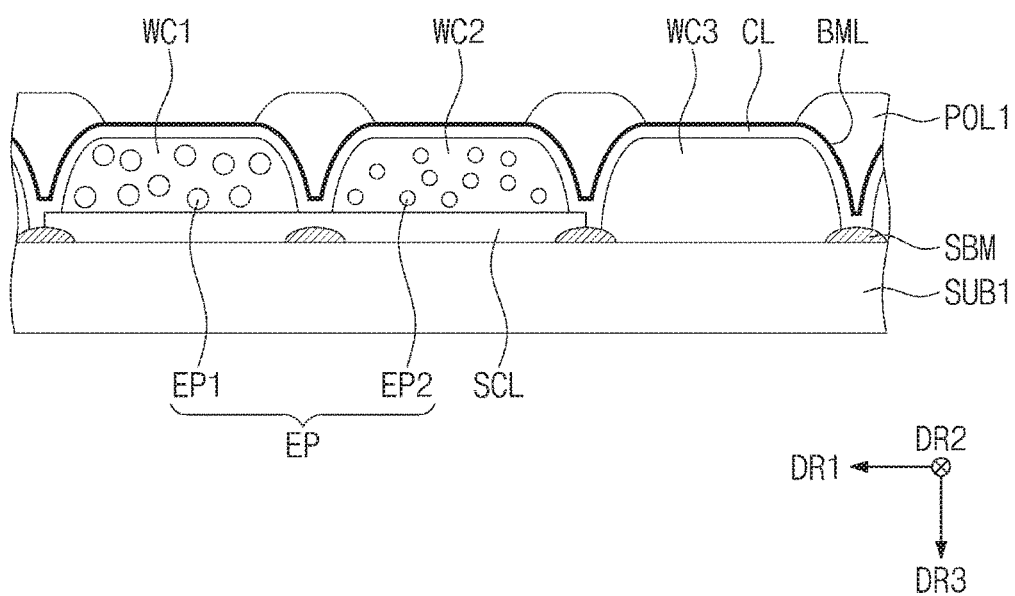

Referring to FIG. 7G, a patterning process (e.g., a photolithography process) may be performed on the first organic preliminary layer BOL1 to form a first organic layer POL1. A portion of the first organic preliminary layer BOL1 that overlaps the center region CA (e.g., see FIG. 2) of each of the first to third wavelength conversion parts WC1, WC2, and WC3, may be removed by the patterning process. As a result, the first organic layer POL1 may overlap only the outer region OA of each of the first to third wavelength conversion parts WC1, WC2, and WC3, when viewed in a plan view. As an example, the first organic layer POL1 may be formed on an inclined surface of each of the first to third wavelength conversion parts WC1, WC2, and WC3 and between adjacent ones of the first to third wavelength conversion parts WC1, WC2, and WC3.

Figure 7H:
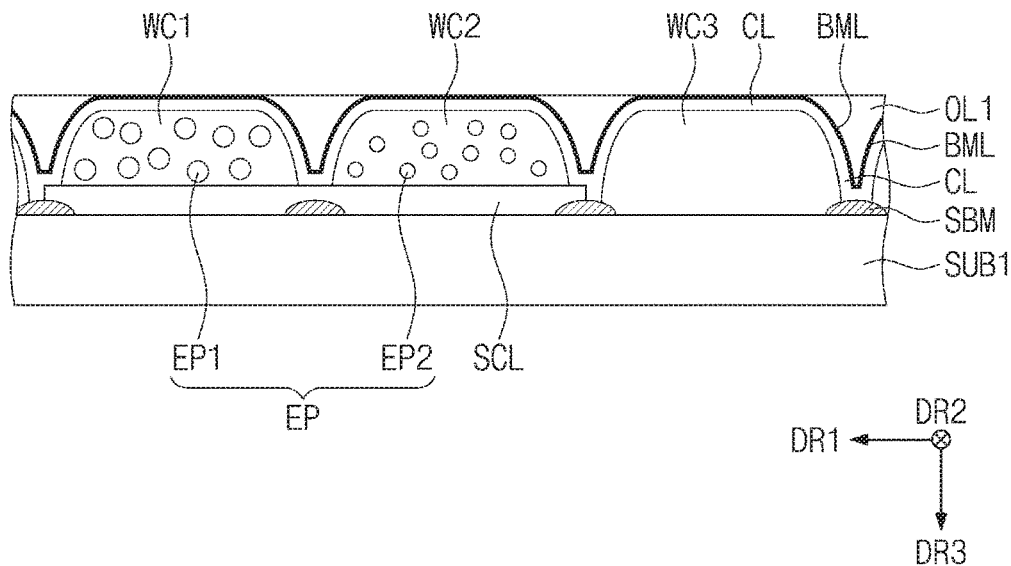

Referring to FIG. 7H, a polishing or planarization process may be performed on the first organic layer POL1. For example, a chemical mechanical polishing (CMP) process may be performed to planarize a surface of the first organic layer POL1. As a result of the polishing process on the first organic layer POL1, the first organic layer OL1 may be formed between the first to third wavelength conversion parts WC1, WC2, and WC3. The metal layer BML may be used as a stopper for the polishing process.

Figure 7I:
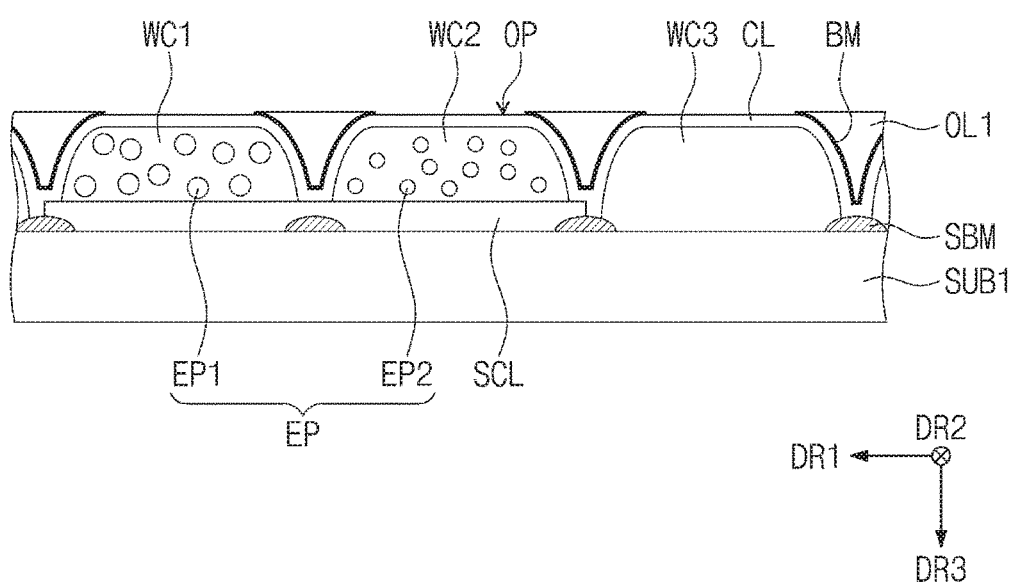

Referring to FIG. 7I, the metal layer BML exposed by the first organic layer OL1 may be removed to form the light blocking layer BM. For example, a wet or dry etching process may be performed for a partial removal of the metal layer BML corresponding to the central region CA. The first organic layer OL1 may be used as an etch mask during the partial removal of the metal layer BML. That is, the metal layer BML may be patterned using the first organic layer OL1 as an etch mask, without an additional mask.

During the polishing process of the first organic layer POL1, the surface of the metal layer BML may be scratched to have an uneven profile. However, according to the afore-described method, the uneven portion of the metal layer BML may be removed, and this may improve optical characteristics of the display device DD. After the process shown in FIG. 7I, the first polarizing layer PO1 may be formed on the first organic layer OL1 and portions of the cover layer CL exposed through the opening OP, as shown in FIG. 2.

Figure 8:
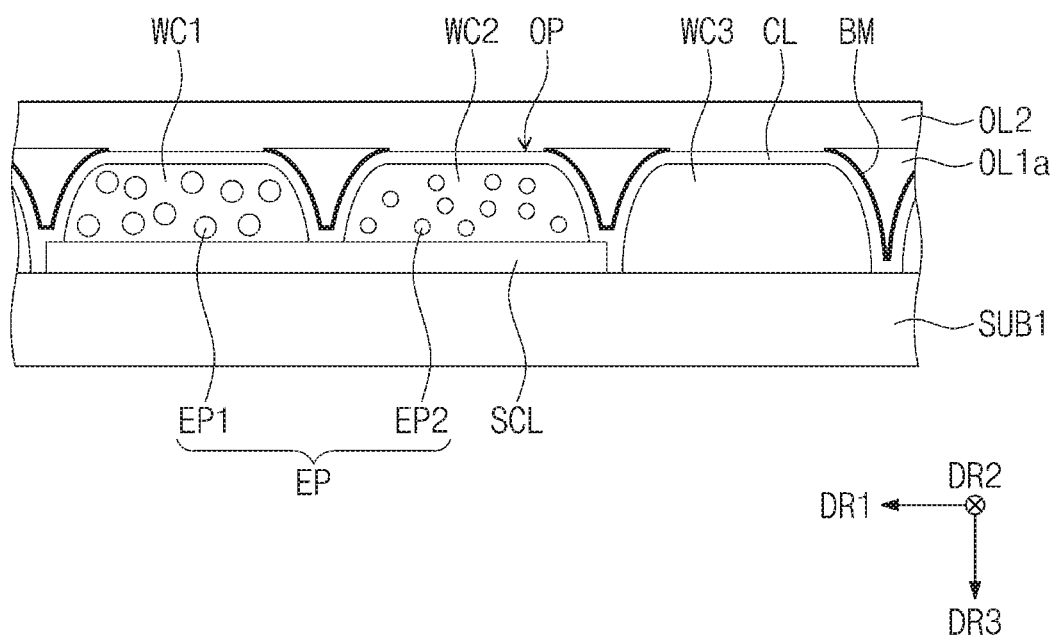
FIG. 8 is a sectional view illustrating a step in a process of fabricating a display panel, according to some embodiments of the inventive concept.

In the fabrication process described with reference to FIGS. 7A to 7I, it may be possible to omit an additional organic layer covering the first organic layer OL1 and the cover layer CL. That is, it may be possible to reduce the number of organic layers for the display device DD and consequently the fabrication cost of the display device DD. FIG. 8 is a sectional view illustrating a step in a process of fabricating a display panel, according to some embodiments of the inventive concept. For example, FIG. 8 illustrates a step in a process of fabricating the display panel DP of FIG. 4.

Referring to FIG. 8, the second organic layer OL2 may be further formed to cover the first organic layer OL1a. The first organic layer OL1a may be an organic layer planarized by a chemical mechanical polishing process, for example, the first organic layer OL1 of FIG. 7I. In the embodiment of FIG. 8, since the first organic layer OL1a is planarized before the formation of the second organic layer OL2, a process of planarizing the second organic layer OL2 may be omitted.

A difference in height between the uppermost top surface of the first organic layer OL1a and the uppermost top surface of the cover layer CL may be removed by the second organic layer OL2. That is, owing to the second organic layer OL2, the first polarizing layer PO1 (e.g., see FIG. 4) may be formed on a surface with increased flatness.

FIGS. 9A to 9D are sectional views illustrating steps in a process of fabricating a display panel, according to some embodiments of the inventive concept. For example, FIGS. 9A to 9D illustrate steps in a process of fabricating the display panel DP of FIG. 5. An element described with reference to FIG. 5 will be identified by the same reference number without repeating an overlapping description thereof.

Figure 9A:
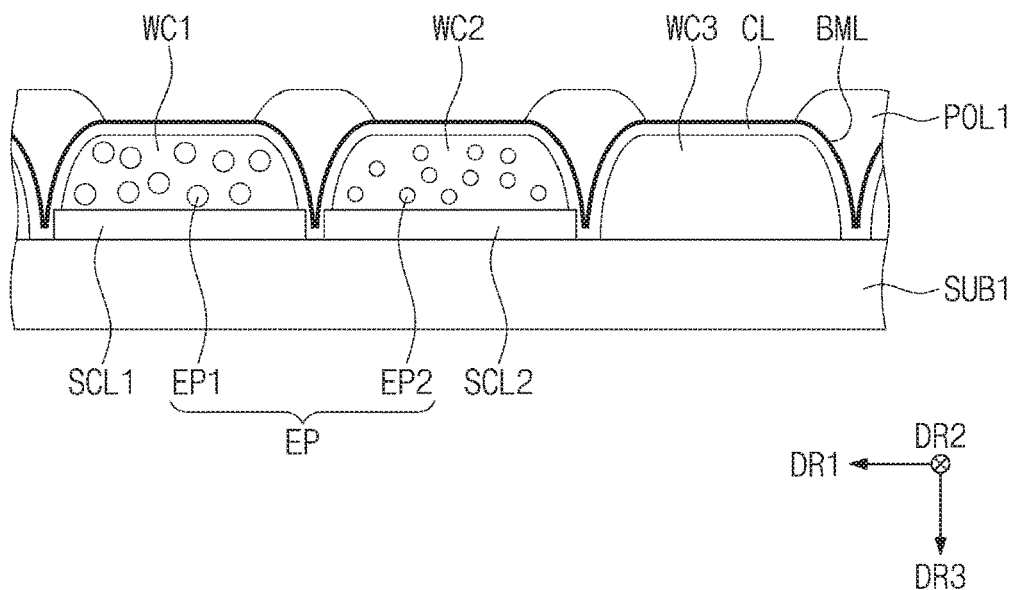
FIGS. 9A to 9D are sectional views illustrating steps in a process of fabricating a display panel, according to some embodiments of the inventive concept.

Referring to FIG. 9A, the first supplementary conversion part SCL1 and the second supplementary conversion part SCL2 may be formed on the first base substrate SUB1. The first wavelength conversion part WC1 including the first emission body EP1 may be formed on the first supplementary conversion part SCL1, and the second wavelength conversion part WC2 including the second emission body EP2 may be formed on the second supplementary conversion part SCL2. The third wavelength conversion part WC3 may be formed on a region of the first base substrate SUB1, in which the first and second supplementary conversion part SCL1 and SCL2 are not formed.

The cover layer CL may be formed on the first to third wavelength conversion parts WC1, WC2, and WC3. The metal layer BML may be formed on the cover layer CL. A first organic preliminary layer (not shown) may be formed on the metal layer BML, and then, a patterning process (e.g., a photolithography process) may be performed on the first organic preliminary layer to form the first organic layer POL1. The first organic layer POL1 may be used as an etching mask in a subsequent process of etching the metal layer BML.

Figure 9B:
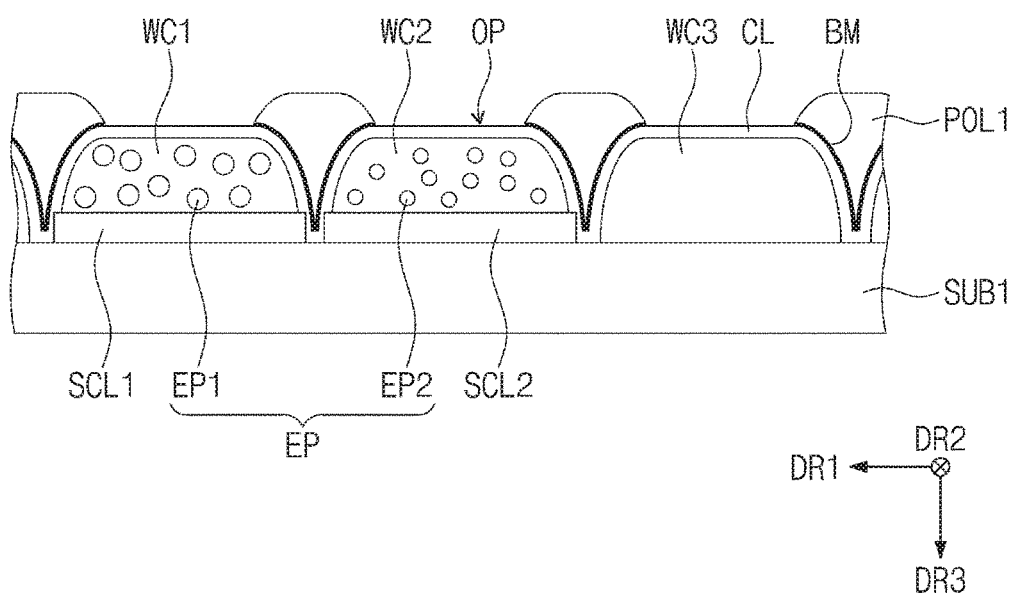

Referring to FIG. 9B, the metal layer BML of FIG. 9A may be patterned to form the light blocking layer BM.

Figure 9C:
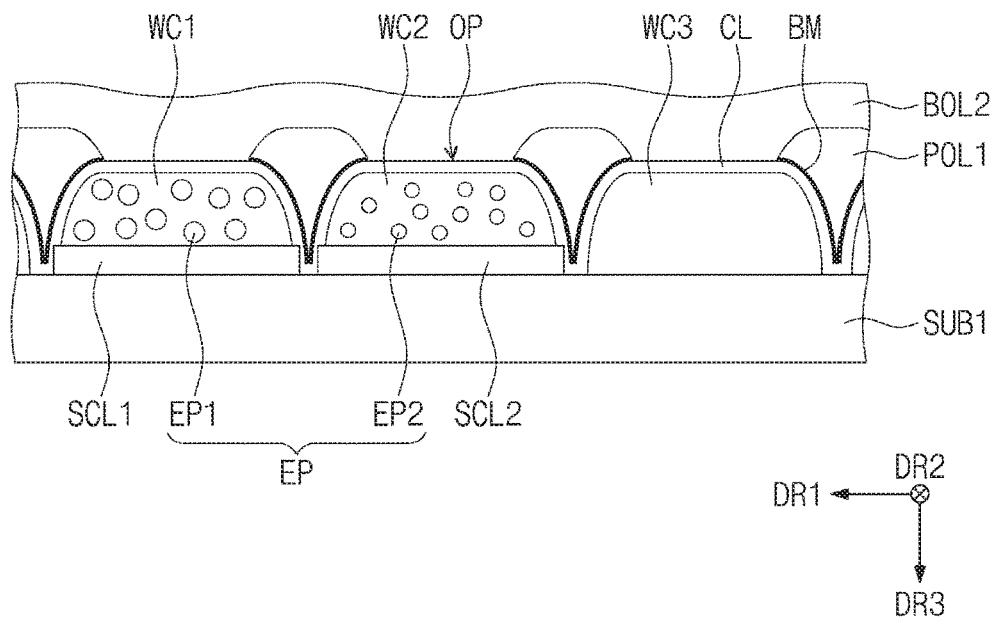

Referring to FIG. 9C, a second preliminary organic layer BOL2 may be formed to cover the first organic layer POL1 and the cover layer CL. In a case where the second preliminary organic layer BOL2 is thin, the second preliminary organic layer BOL2 may be formed to have an uneven top surface, due to a difference in height between the uppermost top surface of the first organic layer POL1 and the uppermost top surface of the cover layer CL. In some embodiments, the second preliminary organic layer BOL2 is provided to have a large thickness to provide a substantially flat top surface.

A variation in height of the top surface of the second preliminary organic layer BOL2 may be less than the difference in height between the uppermost top surface of the first organic layer POL1 and the uppermost top surface of the cover layer CL. That is, the second preliminary organic layer BOL2 may improve an initial flatness before the polishing process.

Figure 9D:
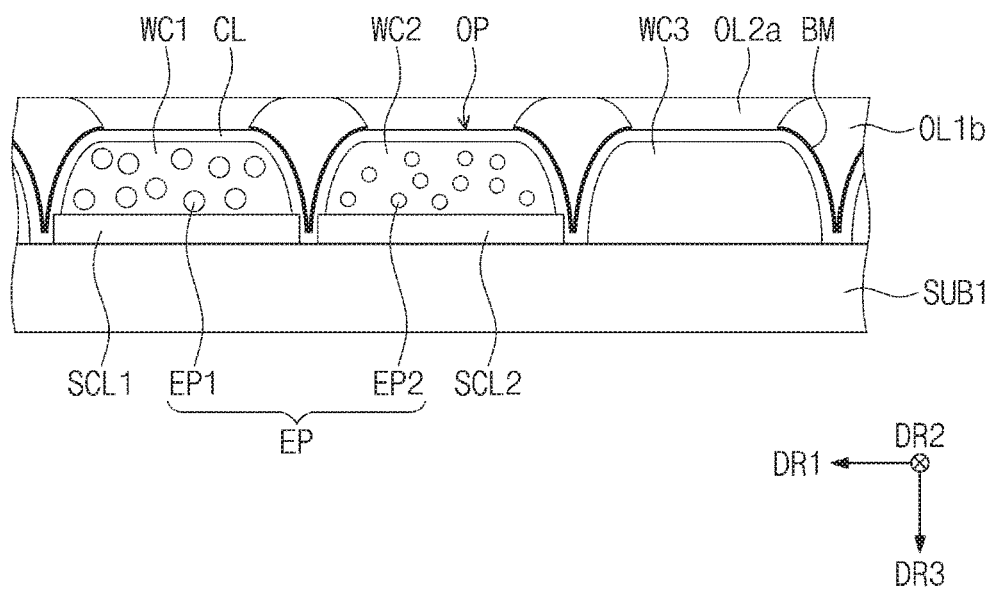

Referring to FIG. 9D, top surfaces of the second preliminary organic layer BOL2 and the first organic layer POL1 may be planarized by a polishing process (e.g., a chemical mechanical polishing (CMP) process). The second preliminary organic layer BOL2 may be polished to form the second organic layer OL2a, and the first organic layer POL1 may be polished to form the first organic layer OL1b. However, the inventive concept is not limited to this example, and in certain embodiments, only the second preliminary organic layer BOL2 may be polished.

During the polishing process on the second preliminary organic layer BOL2, each of the first to third wavelength conversion parts WC1, WC2, and WC3 and the first organic layer POL1 that are below the second preliminary organic layer BOL2 has a convex sectional shape. That is, the first organic layer POL1 may be formed to fill valley regions between the adjacent one of the first to third wavelength conversion parts WC1, WC2, and WC3. Thus, compared to a case without the first organic layer POL1, it may be possible to uniformly control a compressive property throughout the entire region, during the polishing process. Thus, it may be possible to more easily control a flatness property.

According to some embodiments of the inventive concept, an outer region of a wavelength conversion part may be covered with a light blocking layer. Thus, if light is emitted from an emission body in a wavelength conversion part toward a neighboring wavelength conversion part, the light may be reflected by the light blocking layer and may be re-incident into the wavelength conversion part that includes the emission body. Accordingly, a color-mixing issue between adjacent pixels may be prevented by the light blocking layer. In addition, light reflected by the light blocking layer may propagate toward a center of the wavelength conversion part. Such a centrally-concentrated propagation of the reflected light may increase brightness of the corresponding pixel and increase a contrast ratio of a display device.

Furthermore, a first organic layer may be provided in a valley region between adjacent wavelength conversion parts to fill the valley region. When a polishing process is performed on a second organic layer provided on the first organic layer, it may be possible to uniformly control a compressive property throughout the entire region. Thus, it may be possible to more easily control a flatness property.

While example embodiments of the inventive concept have been particularly shown and described, it will be understood by one of ordinary skill in the art that variations in form and detail may be made therein without departing from the spirit and scope of the attached claims.

What is claimed is:

1. A display panel, comprising:
a first base substrate;
a second base substrate facing the first base substrate;
a plurality of light control parts that are provided on the first base substrate to face the second base substrate, and at least one of the plurality of light control parts comprises an emission body;
a light blocking layer partially covering the plurality of light control parts and having a plurality of openings, the light blocking layer comprising a metallic material;
a first organic layer provided on the light blocking layer without overlapping the plurality of openings, and the first organic layer having a convex sectional shape; and
a second organic layer covering the plurality of openings and only partially overlapping the first organic layer, when viewed in a plan view,
wherein the light blocking layer has a curved inclined surface that reflects light, and
wherein the first organic layer and the second organic layer provide a flat surface.

2. The display panel of claim 1, wherein the emission body is a quantum dot.

3. The display panel of claim 1, further comprising a cover layer that is provided between the plurality of light control parts and the light blocking layer to cover the plurality of light control parts,
wherein each of the plurality of openings exposes a portion of the cover layer.

4. The display panel of claim 3, wherein the cover layer includes an inorganic layer or an inorganic layer and an organic layer.

5. The display panel of claim 1, further comprising a supplementary light blocking layer that is provided on a surface of the first base substrate to overlap the light blocking layer,
wherein the light blocking layer is provided between the supplementary light blocking layer and the first organic layer, when viewed in a sectional view.

6. The display panel of claim 5, wherein the supplementary light blocking layer comprises an organic light-blocking material.

7. The display panel of claim 1, wherein the plurality of light control parts comprise:
a first light control part including a first emission body configured to absorb a first color light and to emit a second color light, whose color is different from that of the first color light;
a second light control part including a second emission body configured to absorb the first color light and to emit a third color light, whose color is different from those of the first and second color lights; and
a third light control part configured to allow the first color light to pass therethrough.

8. The display panel of claim 7, further comprising a supplementary conversion part provided between the plurality of light control parts and the first base substrate,
wherein the supplementary conversion part is spaced apart from with the third light control part, when viewed in a plan view.

9. The display panel of claim 8, wherein the supplementary conversion part comprises a first color filter layer, and the first color filter layer is a yellow color filter layer.

10. The display panel of claim 8, wherein the supplementary conversion part comprises a second color filter layer that is configured to emit light whose color is same as that of the second color light, and a third color filter layer that is configured to emit light whose color is same as that of the third color light,
wherein the second color filter layer is provided between the first light control part and the first base substrate, and
wherein the third color filter layer is provided between the second light control part and the first base substrate.

11. The display panel of claim 1, further comprising a polarizing layer disposed directly on the first organic layer and the second organic layer.

12. A display device, comprising:
a display panel configured to display an image; and
a backlight unit provided adjacent to the display panel to provide light to the display panel,
wherein the display panel comprises:
a first base substrate;
a second base substrate provided between the first base substrate and the backlight unit;
a liquid crystal layer provided between the first base substrate and the second base substrate;
a plurality of light control parts provided between the first base substrate and the liquid crystal layer, and configured to change a wavelength of light incident thereto or to allow the incident light to pass therethrough;
a metal light blocking layer partially covering the plurality of light control parts and having a plurality of openings, wherein each of the plurality of openings is provided at a position corresponding to a center region of a corresponding one of the plurality of light control parts; and
a first organic layer provided on the metal light blocking layer without overlapping the plurality of openings, when viewed in a plan view, and the first organic layer having a convex sectional shape; and
a second organic layer covering the plurality of openings and only partially overlapping the first organic layer, when viewed in the plan view,
wherein the first organic layer protrudes more than the metal light blocking layer from the first base substrate, and wherein the first organic layer and the second organic layer provide a flat surface.

* * * * *